United States Patent [19]

Busch

[11] Patent Number: 4,648,444
[45] Date of Patent: Mar. 10, 1987

[54] TENSILE RING CABLE HEAD ASSEMBLY

[75] Inventor: Randolph A. Busch, Sugarland, Tex.

[73] Assignee: Halliburton Company, Duncan, Okla.

[21] Appl. No.: 724,365

[22] Filed: Apr. 17, 1985

[51] Int. Cl.⁴ ............................................ E21B 47/00
[52] U.S. Cl. ..................................... 166/65.1; 285/3; 285/922; 403/2
[58] Field of Search .................. 166/65.1, 66.4; 403/2, 403/15, 31, 32, 11, 307; 285/18, 33, 34, 35, 306, DIG. 21, DIG. 23, 177, 3; 73/151, 152; 339/94 R, 94 M

[56] References Cited

U.S. PATENT DOCUMENTS

| | | | |
|---|---|---|---|
| 1,917,939 | 7/1933 | Heeter | 285/3 |
| 2,935,302 | 5/1960 | Cavins | 166/243 |
| 2,971,178 | 2/1961 | Reesby | 339/7 |
| 3,001,802 | 9/1961 | Rebman et al. | 339/101 |
| 3,054,848 | 9/1962 | Reesby et al. | 285/35 |
| 3,193,309 | 7/1965 | Morris | 285/27 |
| 3,253,653 | 5/1966 | Layne, Sr. | 285/33 X |
| 3,327,784 | 6/1967 | Pardue | 166/66.4 |
| 3,373,817 | 3/1968 | Cubberly, Jr. et al. | 166/66.4 |
| 3,445,805 | 5/1969 | McLoad | 339/89 |
| 3,517,740 | 6/1970 | Johnson | 166/63 |
| 3,594,701 | 7/1971 | Ramsey | 339/94 R |
| 3,685,004 | 8/1972 | Kerr | 339/94 M |
| 3,727,948 | 4/1973 | Current | 285/3 |
| 3,773,109 | 11/1973 | Eberline | 166/54.5 |
| 3,865,199 | 2/1975 | Dermott | 175/4.51 |
| 4,096,752 | 6/1978 | Tonnelli | 73/151 |
| 4,173,363 | 11/1979 | Stearns | 285/177 |
| 4,237,972 | 12/1980 | Lanmon, II | 166/54.5 |
| 4,275,786 | 6/1981 | Lee | 166/65.1 |

FOREIGN PATENT DOCUMENTS 977849 11/1975 Canada .......................... 339/94 R Primary Examiner—James A. Leppink
Assistant Examiner—Matthew Smith
Attorney, Agent, or Firm—Joseph A. Walkowski

[57] ABSTRACT

A weak point element for a cable head comprising a tubular ring having a circumferentially extending zone of reduced tensile strength between the ends thereof. Novel cable head assemblies which substantially isolate the weak point element from other than tensile stress are also disclosed.

16 Claims, 7 Drawing Figures

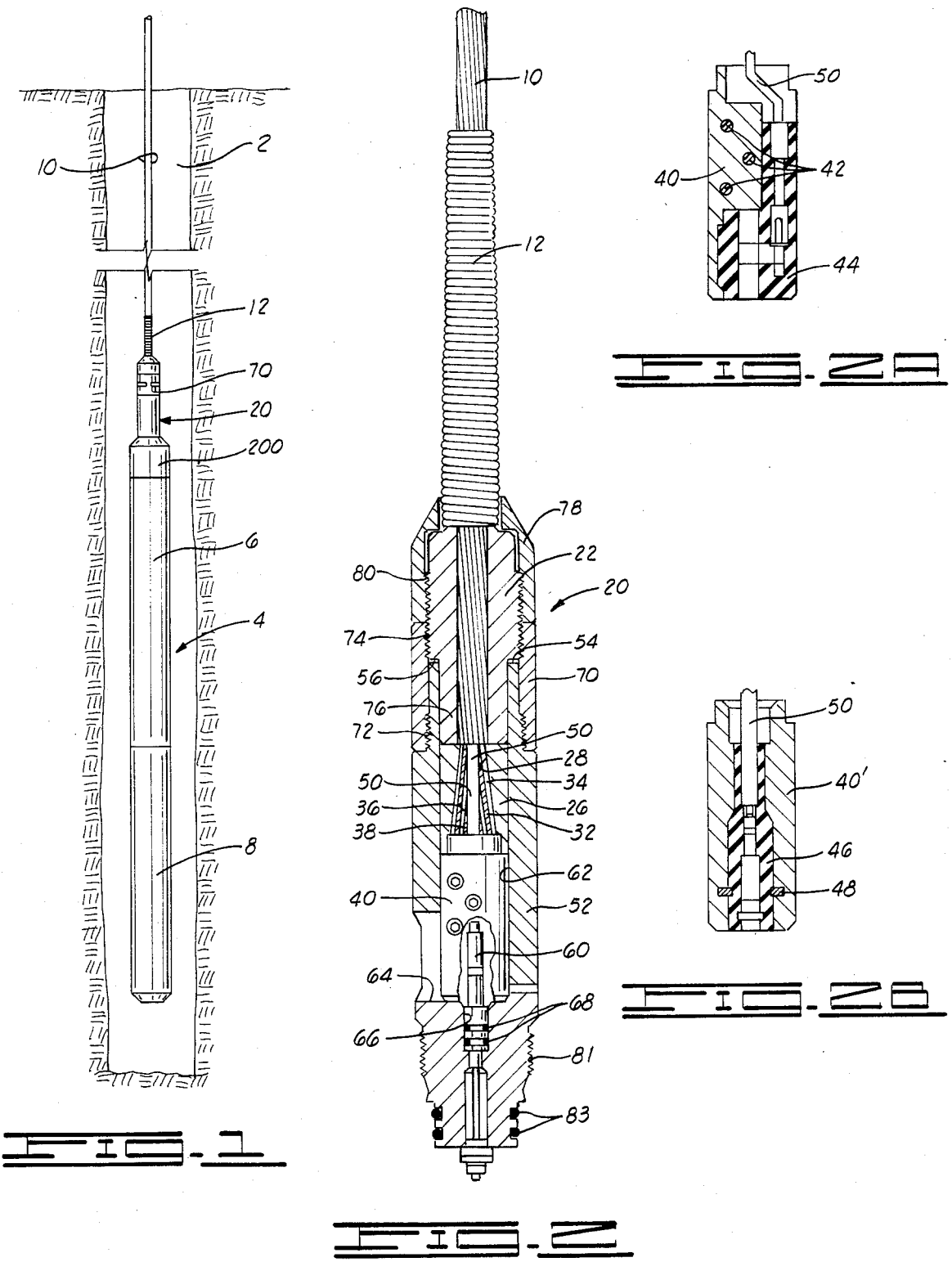

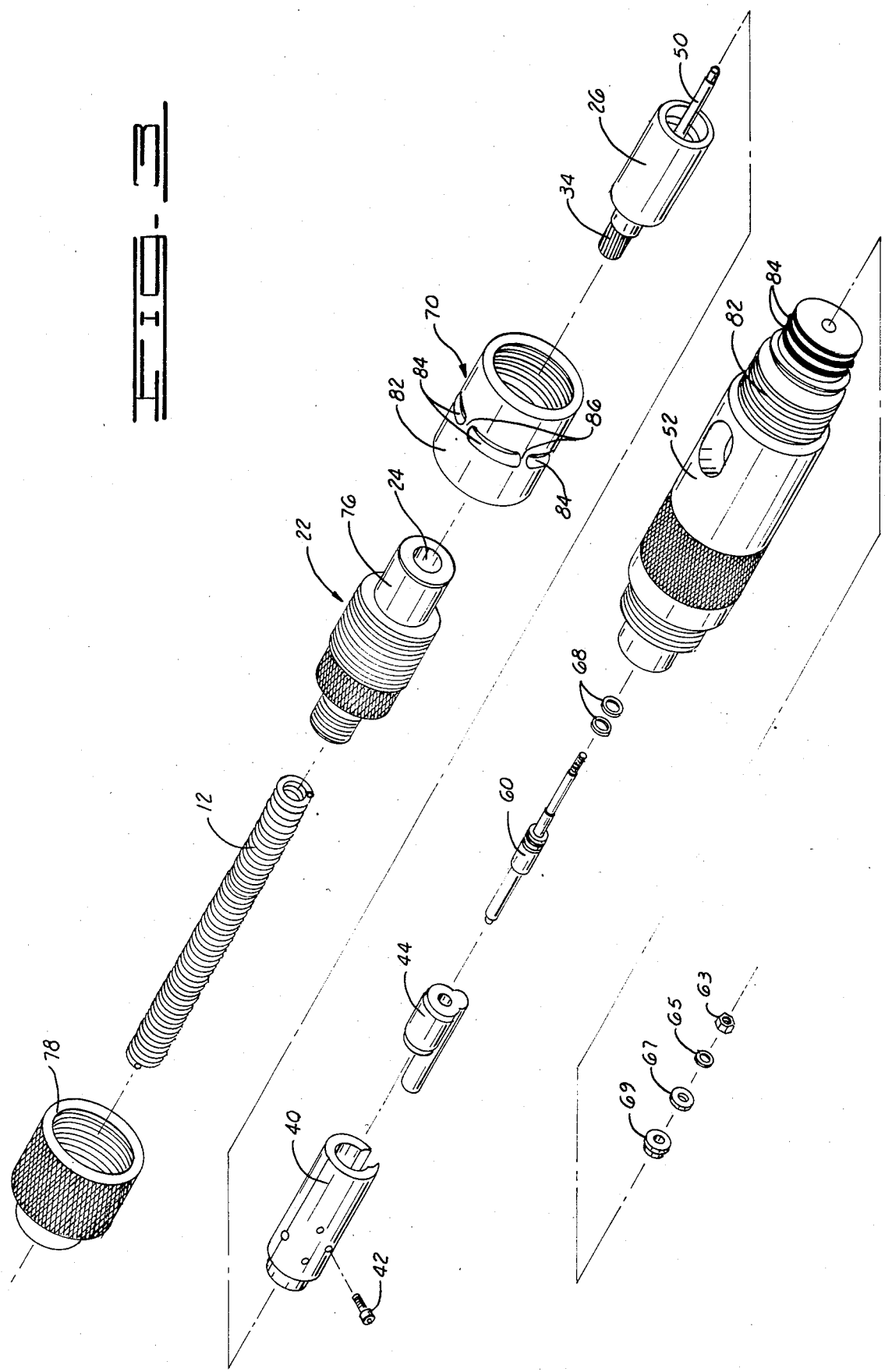

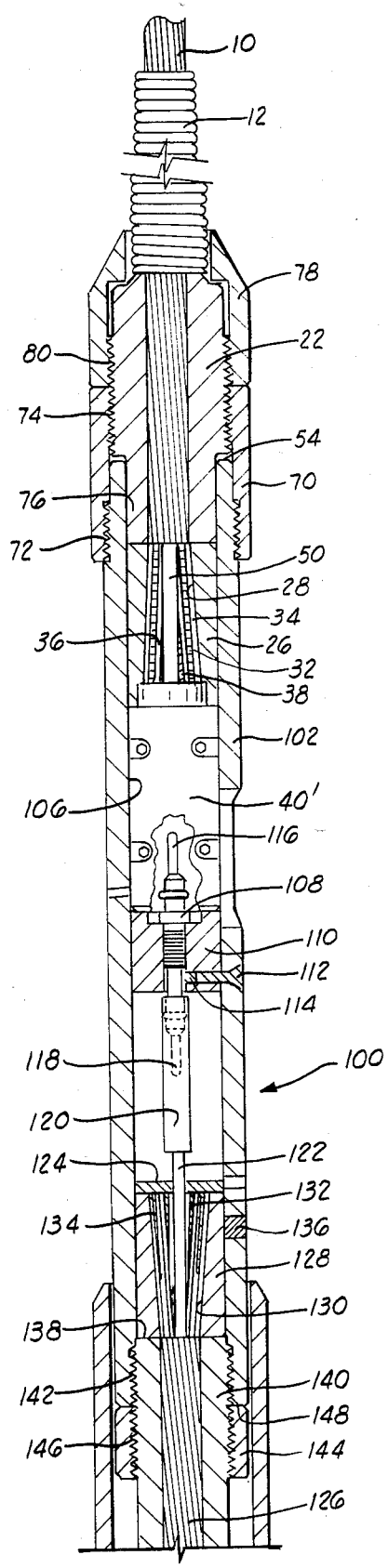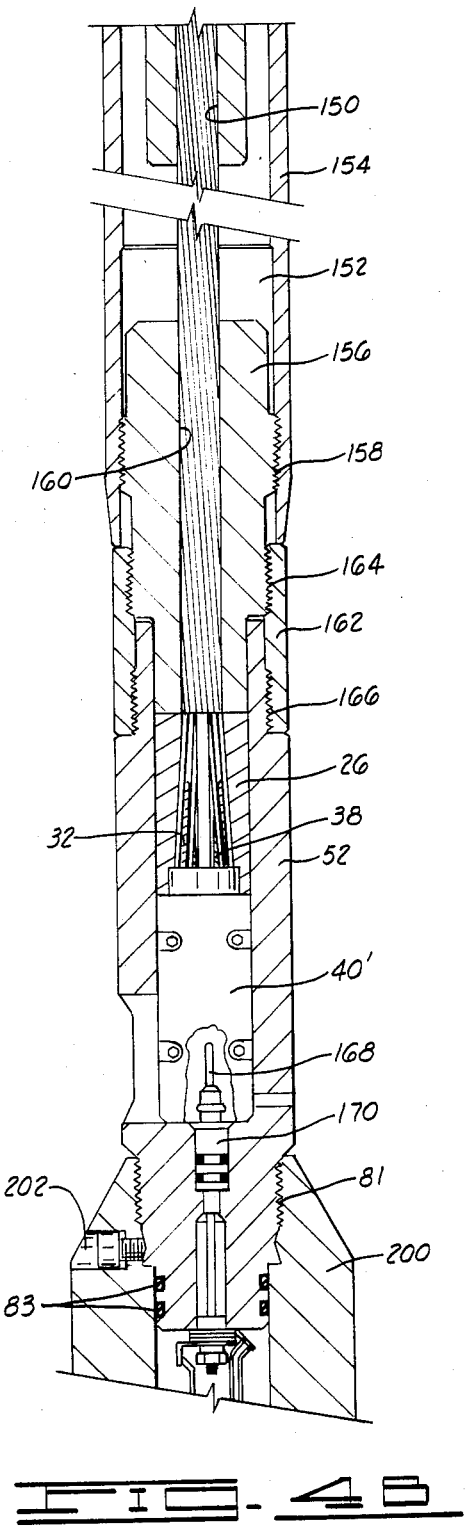
FIG. 4A
FIG. 4B

TENSILE RING CABLE HEAD ASSEMBLY

BACKGROUND OF THE INVENTION

This invention relates to cable heads such as are used in suspending well logging tools at the end of a "wireline" or cable in the borehole of an oil or gas well, in order to determine various parameters associated with the oil and/or gas production potential of formations intersected by the borehole.

A cable head provides for the mechanical and electrical connection of the logging cable to the uppermost tool in the logging tool string. The mechanical connection of the cable head serves three principal functions: first, to securely fasten the logging cable to the female portion of the electrical connection between the cable and the uppermost logging tool; second, to maintain the integrity of the male to female electrical connection; and third, to ensure the failure of the mechanical connection at a predetermined tensile load level. This latter function is important because it is fairly common for cable-supported tools to become stuck in boreholes. The provision of a specific failure point at the cable head permits the operator to preserve the majority of the cable in the event the tool string becomes hopelessly stuck in the borehole. The inclusion of a failure point in the cable head having a lower tensile strength than the cable is generally referred to as providing a "weak-point". It should be noted, however, that a weak point must be strong enough to support the static weight of the tool string suspended from the cable as well as any additional loads imparted to the tool during normal operations or in reasonable efforts to free the tool string should it become stuck Accordingly, the required predetermined tensile failure point of the weak-point is primarily a function of logging depth. Therefore, the weak-point component is offered to the logging operator in several tensile strengths in order to accommodate the needs of logging to different borehole depths. It is, of course, desirable to provide separation of the cable from the tool string at the cable head not only to retrieve as much of the cable as possible, but to avoid a loose skein of cable on top of the cable head, the presence of which would hamper subsequent efforts to "fish" out the tool string by engaging it with a fishing tool such as is known in the prior art.

Known cable heads employing weak point elements suffer numerous disadvantages. For example, the prior art devices are unreliable in their failure points; difficult to inspect to ensure that the weak point element has not been partially stressed even though it remains unfailed and thus will be unpredictable in failure point; hard to replace as they are inside the cable head, requiring disassembly; and cannot be used with perforating guns as the shock from the shaped charge firing may cause unwanted failure of the weak point.

SUMMARY OF THE INVENTION

The present invention relates to a cable head for logging tools which employs a ring-shaped weak point element, or tensile ring. The tensile ring possesses a plurality of substantially evenly circumferentially spaced webs separated by laterally extending circumferential apertures. The tensile ring is preferably heat treated to assure that its tensile yield strength is close to the ultimate strength of the material, and to cut down on strain hardening as the tensile ring is stressed in order to assure greater predictability of the tensile yield point, with attendant tensile failure at the cable head and not in the logging cable. The tensile ring may be incorporated in a cable head shock isolation assembly which minimizes the stressing of the weak point (tensile ring) of the cable head by shocks generated when a perforating gun suspended from the same cable below the logging tool is fired.

BRIEF DESCRIPTION OF THE DRAWINGS

A more complete understanding of the present invention will be obtained by reading the following detailed description of the drawing, taken in conjunction with the accompanying drawings wherein:

FIG. 1 is a schematic view of a well tool suspended from a cable by a tensile ring cable head of the present invention.

FIG. 2 is a full sectional elevation of a preferred embodiment of a tensile ring cable head of the present invention.

FIGS. 2A and 2B are two variations of split connector holders suitable for use with the cable head of the present invention.

FIG. 3 is an exploded assembly of the tensile ring cable head shown in FIG. 2.

FIGS. 4A and 4B are full sectional elevations of a cable head shock isolation assembly of the present invention.

DETAILED DESCRIPTION AND OPERATION OF A PREFERRED EMBODIMENT OF THE INVENTION

FIG. 1 schematically depicts a borehole 2 having suspended therein logging tool string 4, comprising elements 6 and 8. Element 6 may be one or more logging tools, as may element 8 or alternatively, element 8 may be a perforating gun run below logging tools 4. Tool string 4 is suspended in borehole 2 from logging cable 10, which passes through, and is supported in bending against kinking by coil guard spring 12. Cable 10, which may be a standard 7/16" logging cable as is well known in the art, then passes into cable head 20. Tensile ring 70 is shown on the exterior of cable head 20. It should be noted that if element 8 is indeed a perforating gun, a cable head shock isolation assembly 100 as disclosed in the second preferred embodiment of the invention would be employed in lieu of cable head 20, for the reasons set forth in the description of that embodiment.

Referring now to FIGS. 2 and 3 of the drawings, cable 10 is shown passing through guard spring 12, through axial bore 24 of upper connector 22 of cable head 20, and into cup 26, where it terminates. Cup 26 possesses a frusto-conical axially directed bore wall 28, which narrows toward the top of the cable head, or looking "up hole" toward the surface. The cable end inside cup 26 is secured by outer race 32, which compresses the outer strands 34 of cable 10 between the exterior surface of outer race 32 and bore wall 28. The inner strands 36 of cable 10 are compressed between inner race 38 and outer race 32, inner race 38 also preventing relative twisting of inner strands 36 and outer strands 34 with respect to one another. The inner and outer races 38 and 32 both have the same degree of taper as bore wall 28 of cup 26, so as to cause the cable strands, races and cup to jam together tighter as the tensile load on the connection is increased, as occurs when the tool string 4 is suspended in a borehole by the cable.

Cup 26 is fastened to split connector holder 40 by screws 42, split connector holder 40 housing a female connector as is well known in the art. Two examples of such holders 40 and 40' (screws 42 not shown thereon) housing different configurations of female connectors 44 and 46, respectively, are shown in FIGS. 2A and 2B. Female connector 46 is held in holder 40' by ring 48. Insulated cable conductor 50, housed within mechanically supportive cable strands 32 and 38, provides an electrical connection via female connector 44 or 46 to the logging tool(s) below cable head 20. The assembly of cup 26, races 32 and 38 and split holder 40 containing a female connector is inserted into connector sleeve 52, until leading edge 54 of sleeve 52 almost abuts lower annular shoulder 56 on upper connector 22. The female connector 44 then engages male connector 60, which extends upward into upper sleeve bore 62 from lower axial bore 66 of sleeve 52, a pressure-tight seal being effected between male connector 60 and the wall of lower sleeve bore 66 by O-rings 68. Male connector 60 is maintained in lower sleeve bore 66 by abutment of its upper portion against the bottom of bore 66, in conjunction with retainer nut 63, which threads onto the bottom of male connector 60 on lock washer 65, spacer 67 and plug 69, the latter of which maintains the axial orientation of the lower portion of male connector 60. As upper connector 22 enters sleeve 52, it is also surrounded by tensile ring 70, which has been threaded to sleeve 52 at 72, upper connector 22 then being screwed into tensile ring 70 at 74, as it is free to rotate about cable 10. As upper connector 22 screws into tensile ring 70, this assures complete engagement of female connector 44 with male connector 60, as the neck 76 of upper connector 22 is of sufficient length so that connector holder 40 butts up against the bottom 64 of upper sleeve bore 62. Tapered lock ring 78 then threads onto upper connector 22 at 80 and is tightened against tensile ring 70.

The downhole end of sleeve 52 may be threaded by threads 81 to a closure head 200 at the top of the upper most logging tool in the tool string (see FIGS. 1 and 4 for closure head 200). A pressure-tight seal is effected by O-rings 83. Knurled outer surfaces on tapered lock ring 78, upper connector 22, and sleeve 52 provide gripping surfaces when cable head 20 is assembled, and made up with a closure head 200.

Referring again to FIG. 3, tensile ring 70 will be described in more detail. Tensile ring 70 is of metal, preferably of AISI 416 stainless steel. The stainless steel ring is preferably heat treated, such as is known in the art, so that the yield strength is close to the ultimate tensile strength of the material, and the amount of strain hardening experienced by the material when subjected to stress is reduced. This elevation of the yield strength and provision of a greater range of elastic deformation of the tensile ring material results in a more reliable and predictable tensile failure point even after the tensile ring material has been stressed, such as during attempts to free a stuck tool string. In the event the logging tool will be exposed to H2S in the borehole, a ring machined of AISI 17-4PH stainless steel, heat treated to resist corrosion according to NACE (National Society of Corrosion Engineers) standards, as known in the art may be substituted.

The physical configuration of the preferred embodiment of tensile ring 70 is markedly different from prior art weak point elements, comprising a tubular element 82 having female threads at each end thereof and having a plurality, preferably four, of laterally circumferentially extending windows or apertures 84 through the wall thereof, the windows 84 being separated by interposed webs 86 which provide the points of failure, or tensile members. The close sliding fit between upper bore 62 of sleeve 52 and the neck 76 of upper connector 22 carries any bending load applied to which cable head 20 is subjected, ensuring that tensile ring 70 will be substantially completely loaded in tension. This is in marked contrast to some prior art cable heads where the cable itself was employed to provide a weak point. In such prior art apparatus, cable strands were bent over a conical element, the element then being jammed into a complementary recess in a cup-shaped element, the strength of the "weak link" being determined by the number of strands wedged between the two elements; unwanted strands were merely broken off. Alternatively, some prior art cable heads have incorporated therein a single, axially oriented cylindrical rod relatively unsupported against bending loads is employed as a weak point element, rendering the element more susceptible to shear failure or defects in the weak point element material grain structure. Moreover, it is easy to determine if any undue stress has been placed upon tensile ring 70 by visual inspection after each trip into the well. Any distortion of the webs is readily visible, and a new ring 70 may be installed without reheading of the cable and in fact without internal disassembly of the cable head.

In operation, when a tool string 4 becomes stuck in a borehole, and all reasonable attempts at freeing it have failed, tension is applied to cable 10 via a winch at the surface, which tension is imparted to tensile ring 70 of cable head 20 by upper connector 22 and connector sleeve 52 through threaded connections 72 and 74. When the tensile failure point of tensile ring 70 is reached, such being governed by the material and treatment thereof as well as the width and depth of the material in webs 86, ring 70 parts at webs 86. Cable 10 is then retrieved bearing upper connector 22, cup 26, races 32 and 38, split holder 40 or 40' with female connector therein, lock ring 78 and the upper half of tensile ring 70. After retrieval of the cable 10 with the referenced parts from the borehole, the top of connector sleeve 52 provides an easily engaged protrusion at the top of the tool string for subsequent fishing operations. Thus, to make up a cable head 70 to a new logging tool closure head, only a new tensile ring 70 and connector sleeve 52 (with male connector therein) need be supplied.

DETAILED DESCRIPTION AND OPERATION OF A SECOND PREFERRED EMBODIMENT OF THE INVENTION

Referring now to FIGS. 4A and 4B of the drawings, the tensile ring 70 of the present invention is shown incorporated into a cable head shock isolation assembly 100. Parts which are unchanged from those shown in FIGS. 2 and 3 have been referenced with the same numbers. Tensile ring 70 is threaded to the top of shock isolation connector sleeve 102 at 104 rather than to cable head connector sleeve 52. Neck 76 of upper connector 22, cup 26 and split connector holder 40' fit within bore wall 106 of sleeve 102 in close sliding relationship thereto, in similar fashion to the assembly described in FIGS. 2 and 3 with respect to connector sleeve 52. Double pin connector 108 is threaded into pin mounting block 110, which is maintained in position in sleeve 102 by cap screw 112 threaded into screw aperture 114. Upper pin 116 of double pin connector is received within female connector 46 of split holder 40' (see FIG. 2B for connector detail), while lower pin 118 is received in connector boot 120, which provides a mechanical and electrical connection between double pin connector 108 and insulated cable conductor 122. Cable conductor 122 extends through universal washer 124, below which it is surrounded by the mechanically supportive strands of a logging cable 126, of which it is a part. The upper ends of the logging cable strands are mechanically secured within a cable clamp cup 128, having upward-facing frusto-conical bore wall 130 therein. As was previously described with respect to FIGS. 2 and 3, the inner and outer cable strands and cup 128 are secured together through the wedging action of inner race 132 and outer race 134. Cup 128 is maintained within sleeve 102 against upward movement by set screw 136, and against downward movement by the top 138 of upper shock isolation connector 140, which is threaded into sleeve 102 at 142. Upper shock isolation connector 140 is prevented from backing off from sleeve 102 by lock ring 144, which is threaded over shock isolation connector 140 at 146 into abutment with the lower end 148 of sleeve 102.

Logging cable 126 extends through axial bore 150 of shock isolation connector 140 in freely slidable relationship thereto, into cable chamber 152 of shock isolation support tube 154, which extends upwardly over lock ring 144 and sleeve 102 in freely slidable relationship thereto. The bottom end of support tube 154 is threaded to lower shock isolation connector 156 at 158, through the axial bore 160 of which logging cable 126 slidably extends. Full strength tensile ring 162 (no apertures) is threaded to lower shock isolation connector 156 at 164 and to connector sleeve 52 at 166, thereby securing lower shock isolation connector 156 and sleeve 52 together.

The inner and outer strands of lower end of logging cable 126 are secured in a cable cup 26 by inner and outer races 38 and 32 respectively in the same manner as has been described previously with respect to this type of assembly. Cable conductor 122 extends through cup 26 into split holder 40, wherein it engages pin 168 of connector 170 via a female connector 46 (not shown, see FIG. 2B).

Sleeve 52 is secured to the top of closure head 200 by threads 81, a pressure-tight seal being effected by O-rings 83. Set screw 202 prevents backing off. Wires 204 make electrical connection between connector 170 and electrical circuitry in one or more logging tools and perforating guns.

As may readily be seen from FIGS. 4A and 4B, cable head shock isolation assembly 100 provides a rotatable mechanical slip-joint by virtue of the unkeyed telescoping relationship of connector sleeve 102 and support tube 154. Cable chamber 152 is not sealed against well fluid and pressure, so that no pressure-balancing is needed in the telescoping portions of the assembly. Logging cable 126 is securely mechanically anchored to connector sleeve 102 against downward movement by the wedging of its strands with cup 128 and races 132 and 134 which assembly acts upon upper shock isolation connector 140. Likewise, cable 126 is anchored against upward movement relative to connector sleeve 52 by the wedging of its strands with cup 26 and races 32 and 38, which assembly acts upon lower shock isolation connector 156.

Cable conductor 122 may therefore run through the center of cable 126 without any mechanical strain thereon, or on the electrical connections at either end thereof to logging cable 10 or to closure 200, respectively. The firing of a perforating gun will thus impart no appreciable stress to the electrical connections in cable head assembly 100 and no torsional shock whatsoever. Moreover, no torsional, bending or shear stress is imparted to tensile ring 70 due to the unkeyed construction of the slip joint and the internal support provided by upper connector 22 and sleeve 102, as was previously discussed with reference to cable head 20. Finally, the slip joint type construction of cable head shock isolation assembly 100 provides a ready-made "jar" to assist in the freeing of a stuck tool string through taking up and releasing cable 10 by virtue of the free slip joint travel afforded prior to the tightening of cable 126 as cable 10 is taken up.

In the event that the tool string suspended from cable head shock isolation assembly 100 becomes irretrievably stuck in a borehole, the operator may apply tension to the logging cable 10 at the surface and part tensile ring 70 at its webs 86, as was previously discussed with respect to cable head 20. As in that instance, upper connector 22, lock ring 78, cup 26 with races 32 and 38 and split connector holder 40' are retrieved at the end of the logging cable, allowing reconnection to the same or a different sleeve 52 or 102 without reheading of the cable and with only the provision of a new tensile ring 70. After retrieval from the borehole of the referenced parts attached to the cable, the top of sleeve 102 on the stuck tool string provides a clean, unobstructed target for a fishing tool.

It is evident from the above description of the preferred embodiments that a novel and unobvious means for providing a reliable weak point for a cable head, as well as novel and unobvious cable head structures, have been invented.

However, while the present invention has been disclosed in terms of several preferred embodiments, it will be readily apparent to one of ordinary skill in the art that numerous additions, deletions and modifications may be made thereto without departing from the spirit and scope of the invention. For example, the ring-shaped weak point element may possess a circumferential area of reduced wall thickness, rather than having apertures therethrough; the ring may be threaded on its exterior and secured to other cable head elements extending over its ends; raised flanges may be provided at the ring ends, or annular shoulders on the interior thereof to provide tensile load bearing areas; the weak point element may be placed below the slip joint in the cable head shock isolation assembly; a support tube may extend downward over a sleeve extending upward from the lower assembly of the cable head shock isolation assembly; and so on.

I claim:
1. A cable head for connecting a logging cable to a well logging tool, comprising:
   means for electrically connecting said cable to said tool in a longitudinally separable manner;
   means for mechanically connecting said cable to said tool, including a weak point element comprising a substantially tubular ring having two ends and a circumferentially extending reduced tensile strength zone therebetween adapted to part throughout the entire circumferential extent thereof upon longitudinal loading in tension of said ring through said ends.

2. The cable head of claim 1, wherein said reduced tensile strength zone includes a plurality of circumferentially disposed apertures through the wall of said ring, said apertures defining a plurality of webs extending between said ends.

3. The cable head of claim 1, further including means for supporting said reduced tensile strength zone against failure under bending loads.

4. The cable head of claim 3, wherein said ring is disposed on the exterior of said cable head, and said bending load support means extends through said ring.

5. The cable head of claim 4, wherein said means for mechaniclly connecting further includes:
a connector sleeve having a substantially axial interior bore therethrough;
a connector having a substantially axial bore therethrough and a neck received in said connector sleeve bore;
a logging cable and extending through said connector bore; and
cable strand anchor means disposed in said sleeve bore below said neck and secured to said logging cable end;
said connector and said connector sleeve comprise said beinding load support means, and said ring is secured to said connector proximate one end and to said connector sleeve proximate said other end.

6. The cable head of claim 5, wherein said reduced tensile strength zone includes a plurality of circumferentially disposed apertures through the wall of said ring, said apertures defining a plurality of webs extending between said ends.

7. The cable head of claim 5, wherein said cable strand anchor means comprises a cup having a frusto-conical bore therein and a plurality of races interlocked with the strands of said logging cable disposed in said frusto-conical bore.

8. The cable head of claim 7, wherein said electrical connection means includes male and female elements; and
one of said elements is secured to said logging cable; and
the other of said elements is secured to said connector sleeve.

9. The cable head of claim 8, wherein upon parting of said ring at said zone, said logging cable end, said connector, said cable strand anchor means, and one of said elements may be longitudinally disengaged from said connector sleeve and the other of said elements.

10. A cable head shock isolation assembly for connecting a logging cable to a well logging tool, comprising:
longitudinally separable mechanical connection means between said logging cable and said logging tool including an upper assembly secured to said logging cable, a lower assembly secured to said logging tool, a slip joint assembly disposed therebetween and secured to said upper and lower assemblies and a weak point element comprising a substantially tubular ring having two ends and a circumferentially extending reduced tensile strength zone disposed therebetween and adapted to part throughout the entire circumferential extent thereof under longitudinal loading of said ends, thereby causing separation of said mechanical connection means; and
longitudinally separable electrical connection means between said logging cable and said logging tool extending through said assemblies and said slip joint.

11. The cable head shock isolation assembly of claim 10, wherein said upper assembly includes:
an upper connector having a substantially axial bore therethrough and a neck at the lower end thereof, said cable end extending through said upper connector; cable strand anchor means secured to said cable end below said upper connector; and a shock isolation connector sleeve disposed about said anchor means and said neck;
said slip-joint assembly includes:
said shock isolation connector sleeve;
a shock isolation support tube receiving said shock isolation connector sleeve in freely telescoping and rotational relationship; and
a logging cable section mechanically secured at one end to said shock isolation connector sleeve and at the other end to said support tube; and
said lower assembly includes:
a lower connector sleeve secured to said shock isolation support tube.

12. The cable head shock assembly of claim 11, wherein said ring is secured at its upper end to said upper connector and at its lower end to said shock isolation connector sleeve.

13. The cable head shock assembly of claim 11, wherein said ring is secured at its upper end to said support tube and at its lower end to said lower connector sleeve.

14. The shock isolation cable head assembly of claim 11, wherein said slip joint assembly further includes:
an upper shock isolation connector having a substantially axial bore therethrough and secured to the lower end of said shock isolation connector sleeve;
a lower shock isolation connector having a substantially axial bore therethrough and secured to the lower end of said shock isolation support tube and to said lower connector sleeve;
upper and lower slip joint cable strand anchor means above said upper shock isolation connector and below said lower shock isolation connector, respectively, said cable section extending between said shock isolation connectors through the bores thereof and across a variable length cable chamber defined between said shock isolation connectors.

15. The shock isolation cable head assembly of claim 14, wherein said reduced tensile strength zone includes a plurality of circumferentially disposed apertures through the wall of said ring, said apertures defining a plurality of webs extending between said ends.

16. The shock isolation cable head assembly of claim 14, wherein said electrical connection means is separated in said upper assembly upon parting of said ring.

* * * * *